June 5, 1923.
H. H. SPRAGUE
GAS METER
Filed July 14, 1921
1,458,011
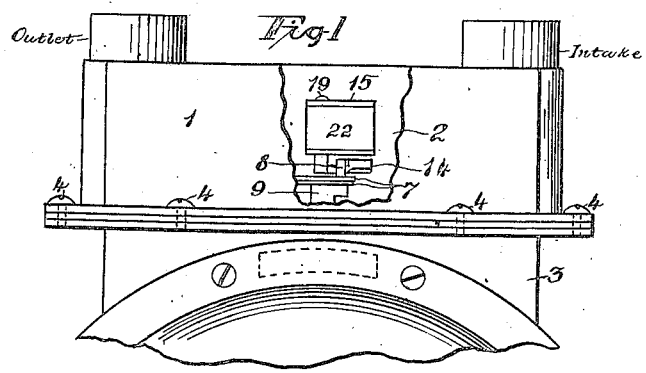
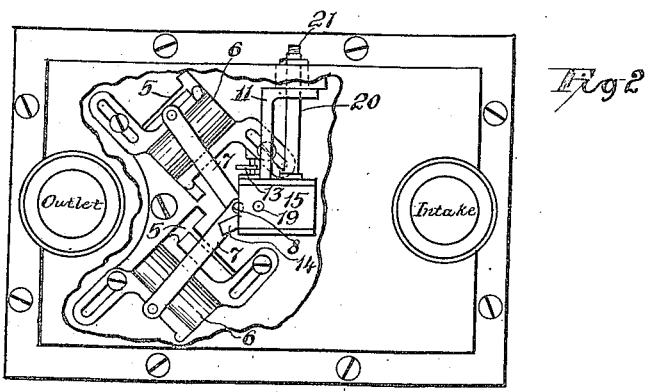
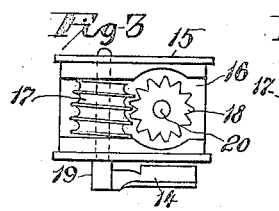
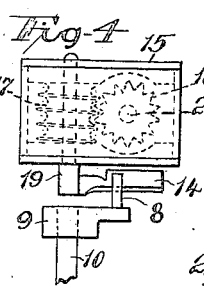
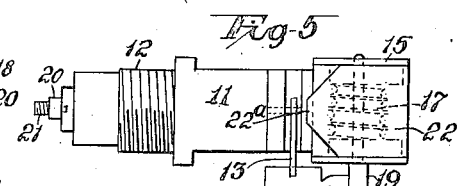
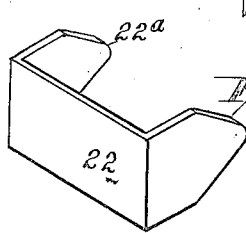
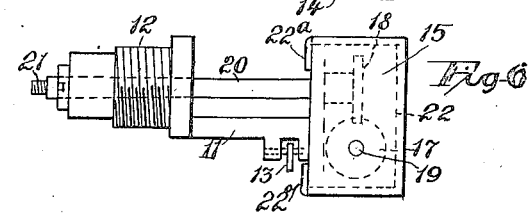
INVENTOR.
Henry H. Sprague,
BY Geo. D. Phillips.
his ATTORNEY.

Patented June 5, 1923.

1,458,011

UNITED STATES PATENT OFFICE.

HENRY H. SPRAGUE, OF BRIDGEPORT, CONNECTICUT, ASSIGNOR TO THE SPRAGUE METER COMPANY, OF BRIDGEPORT, CONNECTICUT.

GAS METER.

Application filed July 14, 1921. Serial No. 484,550.

*To all whom it may concern:*

Be it known that I, HENRY H. SPRAGUE, citizen of the United States, residing at Bridgeport, in the county of Fairfield and State of Connecticut, have invented certain new and useful Improvements in Gas Meters; and I do hereby declare the following to be a full, clear, and exact description of the invention, such as will enable others skilled in the art to which it appertains to make and use the same.

This invention relates to gas meters, and particularly to means adapted to isolate the worm and worm gear of the recording mechanism and thus protect them from the injurious effect of gas condensation, it being an improvement on the patent granted to me February 11, 1919, No. 1,293,965.

There are two types of dry meters on the market, classed as "closed top" and "open top." In the former, the worm and worm gear are enclosed in a dead space or separate chamber in the top of the meter, which chamber requires, approximately, 205 cubic inches of the volume of the entire structure. This not only requires additional material to enclose this dead space but adds materially to the the manufacturing costs, besides, a meter thus constructed, takes up more space both in storage and service. The "closed top" meter has a plurality of shafts and stuffing boxes, and, in repairing a meter of this character, it is necessary to remove the entire top casing and the casing enclosing the valves in order to make the latter accessible for inspection or repairs. In the "open top" meter, there is but one shaft and one stuffing box, and while the worm and worm gear are located in the gas distributing chamber and thereby subject to contact with the gas distillates, it was considered less expensive to replace the worm and worm gear, rendered inoperative by gas condensation, than increase the manufacturing costs by protecting the same in a separate chamber.

My improved construction has all of the advantages of both types of meters without any of their disadvantages, and it consists in enclosing the worm and gear in a housing located in the gas distributing chamber and that will not appreciably reduce the cubical contents of said chamber.

Referring to the accompanying drawings, wherein the same reference characters indicate like parts throughout the several views;

Figure 1 represents a broken view of the body of the meter, and a broken away portion of the meter cap showing an end view of the worm and gear bracket housing and part of the valve operating mechanism;

Figure 2 is a plan view of the meter top broken away to show the bracket housing and the valve mechanism associated therewith;

Figure 3 is a detail end elevation of the bracket housing with its cover removed showing the worm and gear within the chamber of the housing;

Figure 4 is a detail view of the bracket housing with its cover attached thereto, also a broken view of the meter crank shaft and its crank;

Figure 5 is a detail side elevation of the bracket housing with its cover attached to the housing;

Figure 6 is a detail upper plan view of the bracket housing with the cover attached, and Figure 7 is a detail perspective view of the housing cover.

1 represents the cap of the meter construction and 2 its interior representing the gas distributing chamber, 3 the meter body, and 4 the screws attaching the cap to the body. 5, Figure 2, are are valve seats, 6 the valves, 7 the links connecting the valves with the crank pins 8 of the crank 9 mounted on the crank shaft 10, Figure 4.

11 is a bracket having the threaded portion 12 adapted to register with a threaded hole in the side of the cap 1, Figure 2. 13 is the usual pivoted stop lever adapted to be engaged by the flange 14 to prevent a reverse movement of the valves. 15 represents the improved housing means forming an integral part of the bracket 11, and 16 is its chamber in which are located the worm shaft 17 and worm gear 18. The former is mounted on the flag shaft 19 journaled in the sides of the housing, and the latter is mounted on the shaft 20 journaled in the housing and bracket. The inner threaded end 21 of this shaft is adapted to connect with the recording mechanism, not shown.

22 is the detachable housing cover adapted to embrace three sides of the housing and is secured thereto by simply turning its ends 22ᵃ against the rear face of the housing as shown in Figures 5 and 6. Previous, however, to placing the cover in position, the chamber of the housing is filled with an oleaginous substance of a consistency capable of furnishing the necessary lubricant for the worm and gear, and also as a repellent against gas distillates that might possibly work by an improperly fitted cover. In fact, the principal purpose of the housing chamber is to hold sufficient lubricant to absolutely protect the worm and gear against gas impurities, as it would be impossible for the gas to carry impurities enough to penetrate the lubricant. The cover can easily be made to fit close enough to hold the oleaginous substance in place, and can readily be removed to refill the chamber.

Having thus described my invention what I claim is:—

1. In a gas meter of the character described having a gas distributing chamber with crank shaft, valves and the worm and worm gear of the registering mechanism located therein, a bracket secured within the chamber having a housing enclosing said worm and worm gear.

2. In a gas meter of the character described having a gas distributing chamber, recording mechanism comprising a worm and worm gear located within the chamber, a chambered bracket within the gas distributing chamber, said worm and worm gear operatively mounted within the bracket chamber, and a cover enclosing said bracket chamber.

In testimony whereof I affix my signature.

HENRY H. SPRAGUE.